US005343444A

United States Patent [19]

Agut Sanz

[11] Patent Number: 5,343,444

[45] Date of Patent: Aug. 30, 1994

[54] PNEUMATIC TIMER

[75] Inventor: Juan Agut Sanz, Terrassa, Spain

[73] Assignee: Agut, S.A., Terrassa, Spain

[21] Appl. No.: 35,454

[22] Filed: Mar. 23, 1993

[30] Foreign Application Priority Data

Mar. 25, 1992 [ES] Spain .................................. 9200951

[51] Int. Cl.[5] ......................... G09F 1/00; F01B 29/08; F16F 9/04

[52] U.S. Cl. .......................................... 368/1; 368/97; 92/143; 188/298; 251/122

[58] Field of Search ....................... 568/1, 10, 97, 327; 92/143; 251/122; 188/298; 200/34, 83 C

[56] References Cited

U.S. PATENT DOCUMENTS 2,662,594 12/1953 Schaefer .
3,084,865 4/1963 Fleer et al. .
3,178,524 4/1965 Frisk .
3,213,333 10/1965 Mikina et al. .
3,249,716 5/1966 Hatou et al. .
3,797,616 3/1974 Faffart ................................ 188/298
4,256,021 3/1981 Graninger .

FOREIGN PATENT DOCUMENTS 2204667 8/1972 Fed. Rep. of Germany .
618543 7/1980 Switzerland .

*Primary Examiner*—Vit W. Miska
*Attorney, Agent, or Firm*—Darby & Darby

[57] ABSTRACT

A pneumatic timer applicable to electric contactors and has bellows whose air intake is controlled by a limited duct with a variable section and length. The limited duct is established by a radial hole made in flange immobilized with regard to the adjustment knob, that communicates hole of the base or core of the bellows, with the air intake hole made in the core of the adjustment knob, the flange preferably having a transversal or peripheral groove as of the radial hole. When the adjustment knob is placed in a certain position, the timing is governed in terms of the limited duct implied by the length of the transversal groove, which may have a section gradually increasing towards the radial hole. The air duct can also be gauged with the thread of a screw whose head forms a variable annular duct with the wall of an axial truncated-cone hole provided in the core.

8 Claims, 1 Drawing Sheet

PNEUMATIC TIMER

OBJECT OF THE INVENTION

As is expressed in the title of this specification, the present invention refers to an improved pneumatic timer, which has a series of relevant and advantageous features over those that are presently used for this same purpose.

It is of the type applicable to electric contactors and it comprises bellows whose air intake is controlled by a limited duct with a variable length and section. Timers applied to electric circuits and known up to now establish the adjustment of the timelag of corresponding action, by means of the degree of misalignment of some axial holes with regard to an axial groove, made in a washer that also acted as a sealing means. The axial tightening to obtain an adequate sealing had an influence on the degree of adjustment of the time itself and this implied an important lack of precision in the function to be carried out.

The timer in question has means that determine the timelag of the corresponding action, located radially, in such a way that the axial tightening of the unit during assembly thereof, in order to obtain suitable sealing, does not affect at all the timing function. On the other hand such arrangement permits most progressive and more controlled adjustment than that achieved with previous methods.

DESCRIPTION OF THE INVENTION

In general lines, the pneumatic timer that includes the improvements object of the invention, has a flange provided with a radial hole through which air passes towards the bellows of the timer that is adjusted to the frame or base of the bellows. The flange is fit between the core of the adjustment knob and the base to which the bellows is peripherally fastened. The angular position thereof can be varied upon being drawn in rotation by the adjustment knob, upon being axially connected by axial toothing or cotter.

The radial hole of the flange extends along part of the periphery of the same according to a groove, in such a way that depending on the angular position that it adopts, the peripheral groove defines a limited air intake duct, upon being longer or shorter. Besides, it may also have a section gradually increasing towards the cited radial hole.

This limited air duct faces a radial hole of the base or core of the bellows, in order to thus establish the air escaping from the outside to the inside of the bellows, and thus determine the timing in terms of the length of the peripheral or transversal groove.

This peripheral groove of the flange can be made indistinctly inside or outside the periphery of its general anular shape, and even in the core of the adjustment knob.

Irrespective of the place chosen to locate the transversal groove that determines the limited air flow in the core of the adjustment knob there is a truncated-cone blind axial hole in the bottom of which a screw whose head establishes with regard to the wall of said recess, an anular duct whose section can be gauged in terms of the insertion of the air, remains threaded, given that the radial hole of the air intake towards the inside of the bellows is located precisely close to the bottom of this truncated-cone blind hole.

In order to make it easier to under the characteristics of the invention and forming part of this specification, a sheet of drawings in whose figures with a non-restrictive illustrative nature the following has been represented, is attached hereto.

DESCRIPTION OF THE PREFERRED EMBODIMENT

Figure 1:
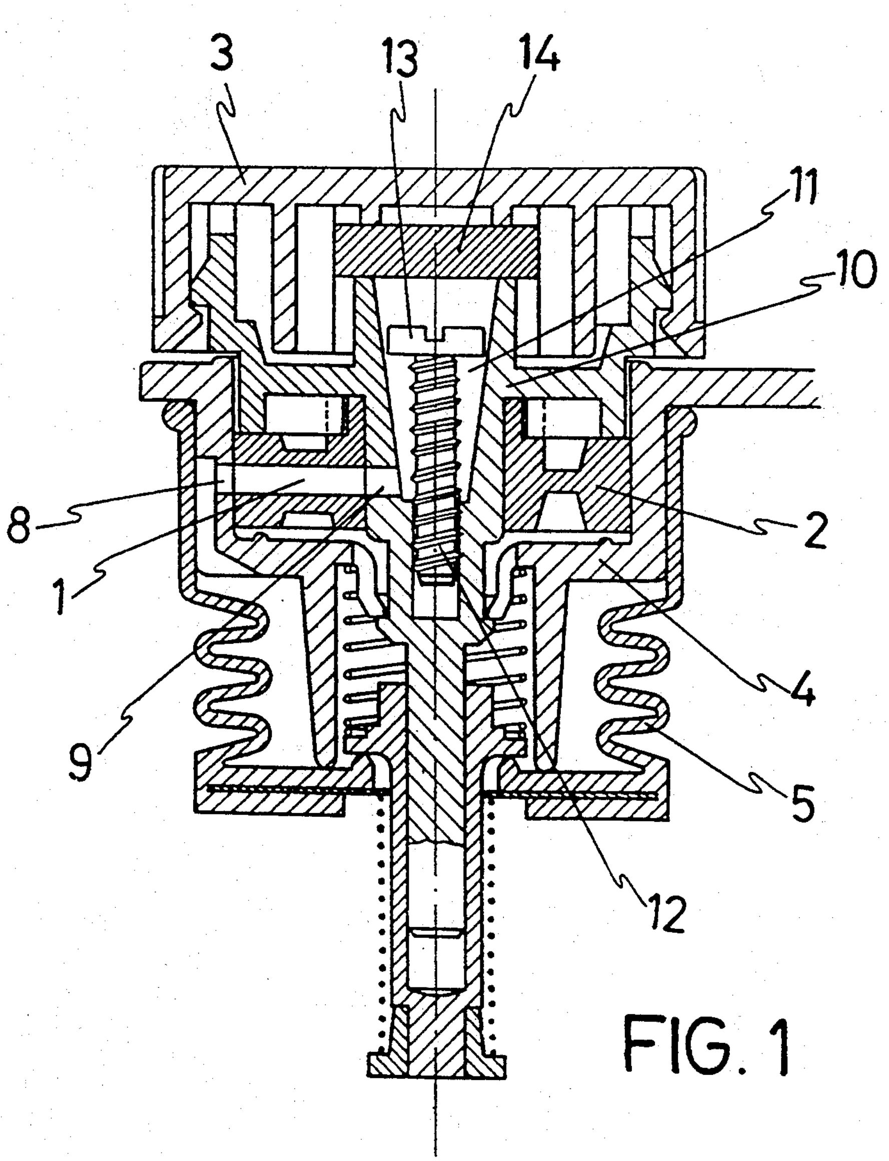
FIG. 1. It is a longitudinal raised section of the improved pneumatic timer, object of the invention.
Figure 2:
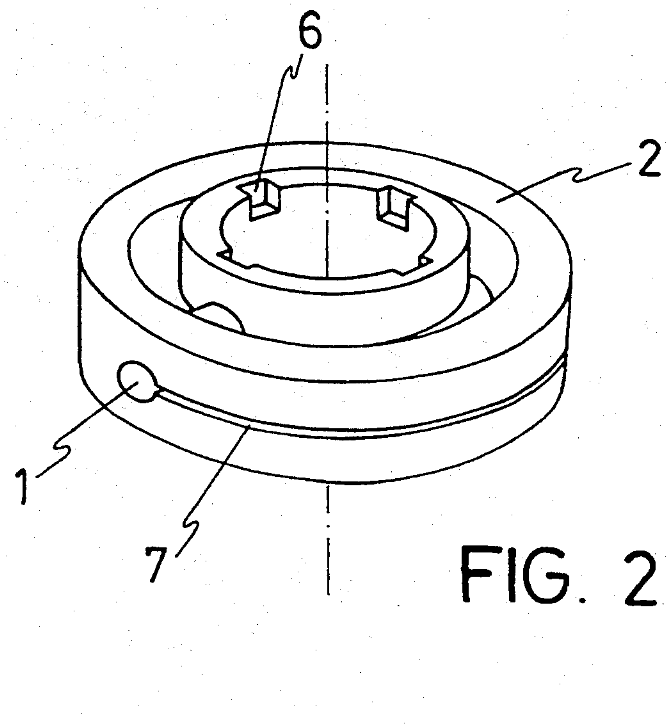
FIG. 2. It is a perspective view of the flange with a radial hole and peripheral transversal groove, which define the limited air flow towards the bellows of the timer.

Referring to the numbers used in the figures, we can see that the pneumatic timer that includes the improvements object of the invention, includes a flange (2) with a radial hole (1) that defines the flow of air towards the bellows (5) of the timer, placed between the adjustment knob (3) and the base or core (4) of the bellows (5) and immobilized with regard to the adjustment knob (3) by means of the front castellation (6), or by means of a similar system.

The transversal groove (7), which faces the hole (8) made in the base or core (4) of the bellows (5), which establishes the escape of air towards the inside of the latter, has been provided for in the mouth of said radial hole (1) made in the periphery of the flange itself (2.) The relative position between the base or core (4) of the bellows (5) and the flange (2), governed by the adjustment knob (3) determines the timing in terms of the length of the transversal groove (7) comprised between the air escape hole (8) made in the base or core (4) of the bellows (5) and the air intake hole (9) made in the core (10) of the adjustment knob (3.)

The transversal groove (7) of the flange (2) optionally has a section decreasing from the radial hole (1), varying its width and/or depth.

The transversal groove (7) may be optionally made in the inner contour of the base or core (4) of the bellows (5), from the air escape hole (8). It may also be made in the inner contour of the flange (2), or else in the core (10) of the adjustment knob (3), in which case the flange (2) would be immobilized with regard to the base or core (4) of the bellows (5.)

The truncated-cone axial hole (11), in the bottom of which the screw (12) whose head (13) established with regard to the inner contour itself of the truncated-cone hole (11), a variable gauge seal of the flow of air from the outside to the base of the truncated-cone hole (11) has been provided for in the core (10) of the adjustment knob (3.) Precisely in said base the hole (9) for the intake of air towards the inside of the bellows (5) of the timer is located.

The sealing between the core (10) of the adjustment knob (3) and the base or core (4) of the bellows (5) is established by the flange itself (2), which is flexible.

On the other hand between the adjustment knob (3) and the core (10) of the same, there is a discoidal body (14) which is permeable in order to establish an air filter.

When pressure is exerted on the bottom of the rod or directly on the base of the bellows (5), there is compression of the latter. When the bellows (5) is released, its own nature establishes its recovery to the initial extended position. The recovery of the bellows (5) is restrained by the limitation of the flow of air towards the inside of the bellows itself (5), the adjustment of said limitation being the means to control the timing.

The limited flow of air starts in the back of the adjustment knob (3), crosses through the discoidal body (14) acting as the filter, passes between the head (13) of the screw (12) until the bottom of the truncated cone-hole (11), passes through hole (9) and hole (1) which are opposite each other, it continues through the transversal groove (7) to hole (8) and from this hole towards the inside of bellows (5.)

The rotation of the adjustment knob (3) also determines the rotation of the flange (2) due to the front castellation (6) with regard to the core (10.) The rotation of the flange (2) determines the degree of misalignment of the radial hole thereof (1) with regard to hole (8) made in the base or core (4) of the bellows (5) and therefore the length of the transversal groove (7) which the air must pass along from radial hole (1) to hole (8.) The longer or shorter length of the groove (7) along which the air passes is the variable that determines the degree of limitation of the flow and therefore the timing, which is proportional to said limitation.

On the other hand, the unit includes an auxiliary gauging system by means of the greater or lesser tightening of the screw (12) with regard to the truncated-cone hole (11) to adjust the real timing time to the suitable indications foreseen on the frame and on the adjustment knob itself (3.)

The sealing of the system is achieved radially by means of the flange itself (2), which simplifies assembly and does not require such exactness of the parts. In effect, with the classic axial seal conventionally used, the sealing was subjected to the tightness of the assembly, to the flatness and dimensional perfection of the parts and to the pressure of the inner spring.

On the other hand, the number of parts needed for the proposed embodiment is much smaller than in prior solutions as most of the mechanized metal parts, which are the most expensive ones, have been eliminated.

I claim:

1. A pneumatic timer for electric contactors comprising:

a base having a first hole;

a bellows having an open end and a closed end, said open end being attached to said base to form a first cavity therebetween;

an adjustment knob having a core and a second cavity formed therebetween, said core having an intake hole;

a flange disposed between said core and said base, said flange having an outer peripheral surface, said peripheral surface includes a transverse groove, said flange includes a radial throughhole, said flange having means for fixedly connecting said adjustment knob to said flange, said transverse groove faces said first hole in said base, said flange and said adjustment knob being rotatably movable with respect to said base to vary a length of said transverse groove between said intake hole and said first hole;

said second cavity, said intake hole, said radial hole, said transverse groove, said first hole and said first cavity being in fluid communication.

2. The pneumatic timer according to claim 1, wherein said transversal groove has a decreasing cross-section from said radial hole.

3. The pneumatic timer according to claim 2, wherein said core of the adjustment knob has a truncated-cone axial hole, a screw is disposed in said axial hole, a head of said screw establishes with an inner contour of the truncated-cone hole a variable gauge seal for the flow of air from the second cavity to the base of the truncated-cone hole.

4. The pneumatic timer according to claim 3, wherein said flange establishes the sealing between the core of the adjustment knob and the base, said flange being made of a flexible material.

5. The pneumatic timer according to claim 4, further including a permeable discoidal body, which acts as an air filter, disposed between the adjustment knob and the core.

6. The pneumatic timer according to claim 1, wherein said core of the adjustment knob has a truncated-cone axial hole, a screw is disposed in said axial hole, a head of said screw establishes with an inner contour of the truncated-cone hole a variable gauge seal for the flow of air from the second cavity to the base of the truncated-cone hole.

7. The pneumatic timer according to claim 1, wherein said flange establishes the sealing between the core of the adjustment knob and the base, said flange being made of a flexible material.

8. The pneumatic timer according to claim 1, further including a permeable discoidal body, which acts as an air filter, disposed between the adjustment knob and the core.

* * * * *